United States Patent [19]
Takenaka et al.

[11] Patent Number: 4,471,515
[45] Date of Patent: Sep. 18, 1984

[54] ROLLS FOR SINGLE FACER

[75] Inventors: Hiroyuki Takenaka; Keiichi Katayama; Kouichi Tokiyasu, all of Hiroshima; Tadashi Hirakawa, Mihara, all of Japan

[73] Assignee: Mitsubishi Jukogyo Kabushiki Kaisha, Tokyo, Japan

[21] Appl. No.: 277,107

[22] Filed: Jun. 25, 1981

[30] Foreign Application Priority Data

Jun. 27, 1980 [JP] Japan .................................. 55-87455

[51] Int. Cl.$^3$ ............................................. B21B 27/00
[52] U.S. Cl. .................................. 29/110; 100/93 RP; 100/162 B; 162/362; 493/463; 156/583.1; 156/581; 165/90; 165/185
[58] Field of Search ................. 29/123, 124, 130, 125, 29/116 R, 116 AD, 113 R, 113 AD, 112, 111, 117, 110; 100/162 B, 93 RP, 161, 162 R, 176; 162/361, 362; 493/463; 156/555, 294, 583.1, 581; 174/28; 165/89, 90, 91, 185, 100 R, 109 T

[56] References Cited

U.S. PATENT DOCUMENTS

| | | | |
|---|---|---|---|
| 2,441,730 | 5/1948 | Stromia | 165/90 X |
| 2,998,472 | 8/1961 | Bondon | 174/28 |
| 3,080,771 | 3/1963 | Baldwin | 74/574 |
| 3,852,860 | 12/1974 | Tewes | 29/110 |
| 3,990,935 | 11/1976 | Lehmann | 29/116 AD X |
| 4,186,162 | 1/1980 | Daley | 264/46.5 |

FOREIGN PATENT DOCUMENTS 1497949  8/1967  France .............................. 174/11 S Primary Examiner—Carl E. Hall
Assistant Examiner—John T. Burtch
Attorney, Agent, or Firm—Bernard, Rothwell & Brown

[57] ABSTRACT

Elongated hollow members or tubes frictionally engage the interior wall of a hollow corrugating roll or a hollow pressure roll of a single facer so as to minimize the elastic vibration thereof and thereby to minimize the noise developed and transmitted during the operation of the single facer. A plurality of such tubes of a given diameter are arranged circumferentially about the interior wall of the shell of a roll of a single facer in such manner that each of the tubes frictionally engages the interior wall and so that each of the tubes also engages the adjacent tubes on either side thereof, thereby providing an assembled structure in which the plurality of tubes resist the elastic deformation of the roll and the resultant elastic vibratiion and thereby reduce the noise level. In a modified form of the invention, a second plurality of tubes of smaller diameter are arranged in similar fashion along a concentric circle radially inward of the first plurality of tubes, each of the second group of tubes being positioned in contact with two adjacent ones of the first group of tubes. A single centrally disposed tube may be positioned for further assisting in holding the assembled tubes in position. In other modified forms of the invention tubes of different diameters and wall thicknesses may be randomly arranged within the roll rather than being positioned in concentric circles of tubes of progressively decreasing diameter from the interior wall to the radially inmost position. In a further modification, annular members fixed to the interior wall of the roll may be provided at the ends of the tubes for further assisting in holding the tubes in position. Sound-deadening materials in solid or liquid form may be provided in some or all of the tubes or in the spaces between adjacent tubes.

20 Claims, 10 Drawing Figures

ated to minimize both overall vibration and the vibration occurring at particular harmonic frequencies.

ROLLS FOR SINGLE FACER

BACKGROUND OF THE INVENTION

1. Field of the Invention

This invention relates to single facers for manufacturing single-faced corrugated paper and more particularly to improved construction of the rolls employed in single facers.

2. Description of the Prior Art

Much progress has been made in recent years in techniques for speeding up the manufacturing operation for making corrugated paper. A single facer (a machine for manufacturing single-faced corrugated paper) is one of the important machines employed in a corrugated paper manufacturing operation and one in which a higher speed of operation is desirable. In achieving such higher speed operation it is necessary to overcome a number of technical problems. One such problem is that to achieve a higher speed operation wherein the paper moves more rapidly over the surface of the corrugating rolls and the pressure roll of a single facer, it is necessary that heat be transferred more rapidly from the interior of the roll, to which heated vapor is normally supplied, to the exterior surface of the roll so as to adequately heat the paper. In the usual single facer, high pressure heated vapor is introduced into the interior of the hollow upper and lower corrugating rolls and the hollow pressure roll to heat a core sheet or a liner moving in contact with the outer circumferential surfaces of these rolls, to thereby improve the corrugating capability and the pasting and bonding capability of the rolls. As the speed of the single facer is increased and, hence, the speed with which the core sheet and liner pass over the surface of the rolls is increased, the amount of heat that can be transferred to a given section of paper moving over the roll through a wall of given thickness is reduced. The rate of heat transfer can be increased to correspond to the increased speed of the paper over the exterior surface of the rolls by reducing the thickness of the wall of each of the rolls. Unfortunately, it has been found that reducing the thickness of the rolls to accomplish greater heat transfer gives rise to another problem, namely, that the thinner-walled rolls tend to have an increased amount of vibration and an increase in noise transmitted thereby. Thus, this decrease in thickness of the wall of the hollow rolls resulted in the occurrence of a metallic noise of increased loudness. It has heretofore been considered that the noise generated by a single facer results mainly from the vibration of a rigid body, that is, vibration occurring when a bending vibration load on a roll generated as a result of a driving load between rolls works as a returning force generated by a roll-supporting bearing which functions as a spring. The occurrence of metallic noise of increased loudness referred to above was analyzed to discover that the noise level increases were due to elastic vibration rather than vibration of a rigid body as discussed above. This elastic vibration means vibration occurring on the basis of the deformation of the roll itself. The higher noise level, therefore, can be ascribed to an increase in the level of elastic vibration of the thinner roll shells and an increase in the level of high frequency vibration caused thereby. The increase in the loudness of noise occurring during a corrugating operation using rolls having walls of reduced thickness is particularly noticeable in the region of a high-speed operation.

The nature of the generated noise may be better appreciated by reference to FIG. 1 which illustrates a so-called Campbell's diagram showing the results of analysis of actual measurements of noise generated by a single facer having a pressure roll with a diameter of 500 mm, a length of 2,200 mm, and a roll wall thickness of 25 mm. This diagram shows the amplitude of the noise by the diameter of the circle for each noise frequency and for overall range of meshing frequency, which is generated when the tips of the corrugations on the lower corrugating roll are beaten by the pressure roll.

As may be noted from this diagram, the noise level becomes high at specific noise frequencies, for example, around 300–500 Hz, 800 Hz, 1500 Hz. These frequencies agree with the natural frequencies (in a mode of $K=1$, $N=2-4$) of a hollow cylindrical shell, as shown in FIG. 2. This means that metallic and discordant noise occurs when natural vibration in the above-mentioned mode takes place due to the meshing frequency NZ and its higher harmonics. The natural frequency of a hollow cylindrical shell is generally decreased as the thickness of the shell is decreased, but, at the higher or second resonance speed, that is at the second harmonic, a larger amplitude occurs depending on the changing damping factor, and this yields undesirable metallic noise. Therefore, attempts to improve the heat transfer rate of a roll by conventional technique to increase the speed of operation, that is, by reducing the thickness of the wall of the roll, gives rise, for the above-discussed reasons, to a problem of an increase in the loudness of the noise.

It is an object of the present invention to provide a single facer having an upper corrugating roll, a lower corrugating roll and a pressure roll so constructed that rolls having thinner walls for greater heat transfer may be employed, but further constructed so that the noise transmitted during the operation of the single facer is minimized.

It is a further object of the present invention to minimize the elastic vibration of the rolls and thereby minimize the noise resulting from such elastic vibration.

SUMMARY OF THE INVENTION

In carrying out the invention in one form thereof, provision is made for frictionally engaging the interior wall of a hollow corrugating roll or a hollow pressure roll of a single facer so as to minimize the elastic vibration thereof and thereby to minimize the noise developed and transmitted during the operation of the single facer. A plurality of elongated hollow members or tubes of a given diameter are arranged circumferentially about the interior wall of the shell of a roll of a single facer in such manner that each of the tubes frictionally engages the interior wall and so that each of the tubes also engages the adjacent tubes on either side thereof, thereby providing an assembled structure in which the plurality of tubes resist the elastic deformation of the roll and the resultant elastic vibration and thereby reduce the noise level. In a modified form of the invention, a second plurality of tubes of smaller diameter are arranged in similar fashion along a concentric circle radially inward of the first plurality of tubes, each of the second group of tubes being positioned in contact with two adjacent ones of the first group of tubes. A single centrally disposed tube may be positioned for further assisting in holding the assembled tubes in position. In other modified forms of the invention tubes of different diameters and wall thicknesses may be randomly arranged within the roll rather than being positioned in concentric circles of tubes of progressively decreasing diameter from the interior wall to the radially inmost position. In a further modification, annular members fixed to the interior wall of the roll may be provided at the ends of the tubes for further assisting in holding the tubes in position. Sound-deadening materials in solid or liquid form may be provided in some or all of the tubes or in the spaces between adjacent tubes.

DETAILED DESCRIPTION OF THE PREFERRED EMBODIMENTS

Figure 1:
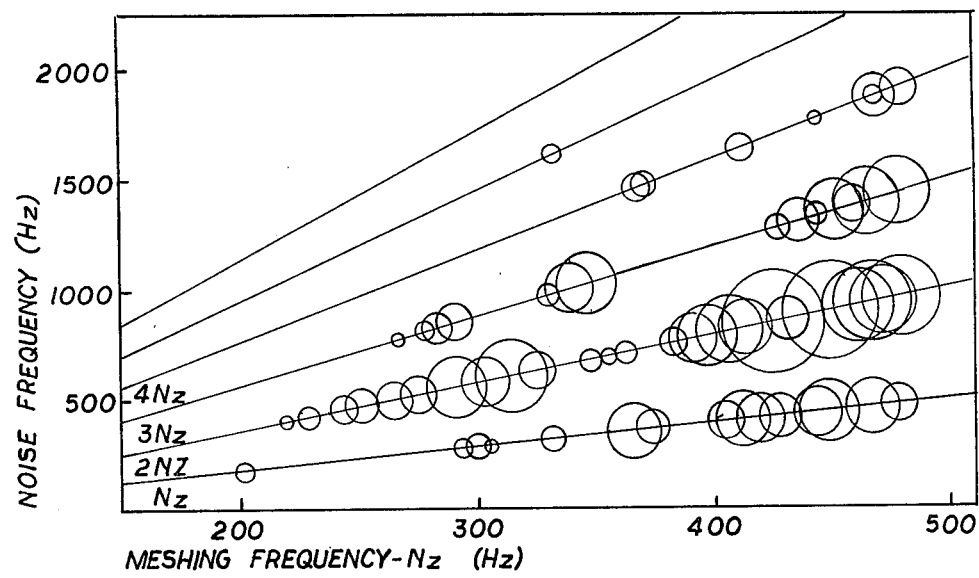
FIG. 1 is a diagram showing the relation between meshing frequencies and the frequencies of noise level in a conventional single facer.
Figure 2:
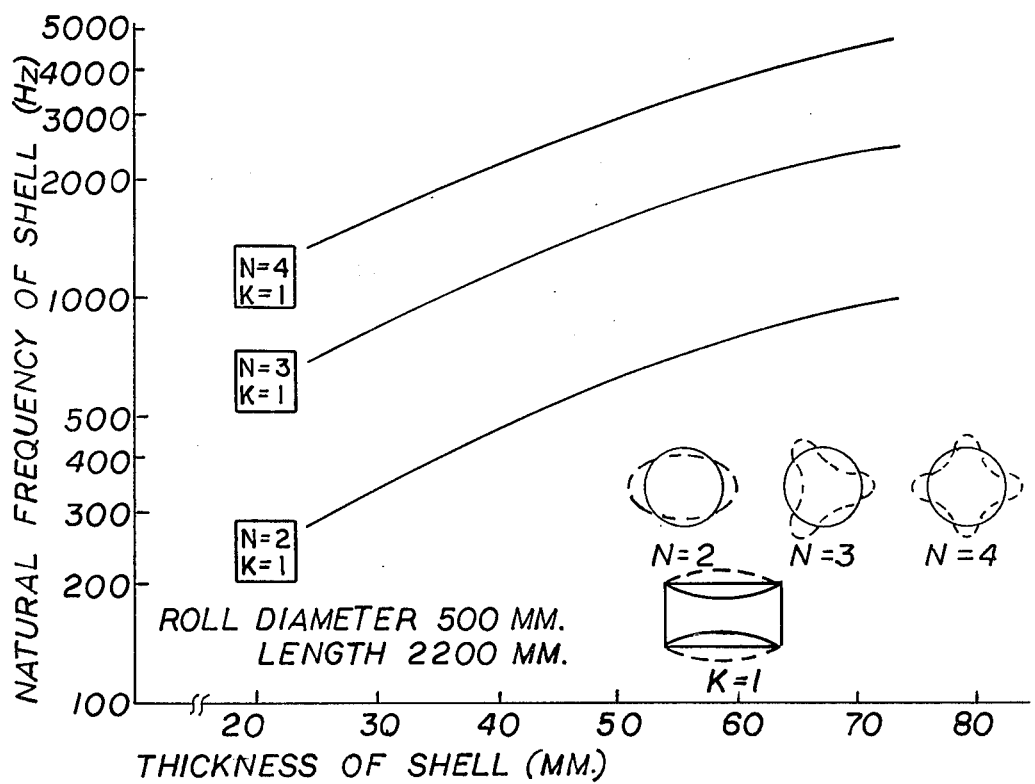
FIG. 2 is a diagram showing the relation between the thickness of a hollow cylindrical roll shell and the natural frequencies thereof.
Figure 3:
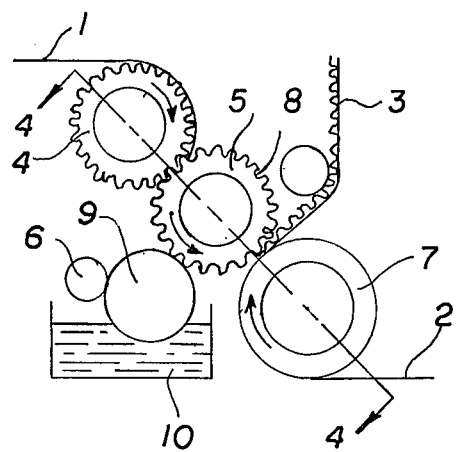
FIG. 3 is a schematic side elevational view of a conventional single facer with which the invention of this application may be employed.

Referring first to FIG. 3, there is shown the general arrangement of a conventional single facer. The single facer continuously manufactures single-faced corrugated paper 3 by corrugating a sheet of paper referred to as a core sheet 1 into a corrugated sheet and bonding another sheet of paper called a liner 2 to the corrugated sheet. The apparatus includes an upper corrugating roll 4, a lower corrugating roll 5, which meshes with the upper corrugating roll 4 to effect corrugation of the sheet 1, and a pressure roll 7 which is urged against the lower corrugating roll to effect bonding of the liner 2 to the corrugated sheet. The corrugating rolls 4 and 5 are formed on the exterior surface to provide a plurality of axially extending meshing teeth 8. The apparatus further includes a pasting roll 6 which rides partially within a paste-containing vessel 10 for applying paste to the tips of the corrugated paper riding along the surface of the lower corrugating roll 5, and a doctor roll 9 for controlling the paste on the pasting roll 6.

Figure 4:
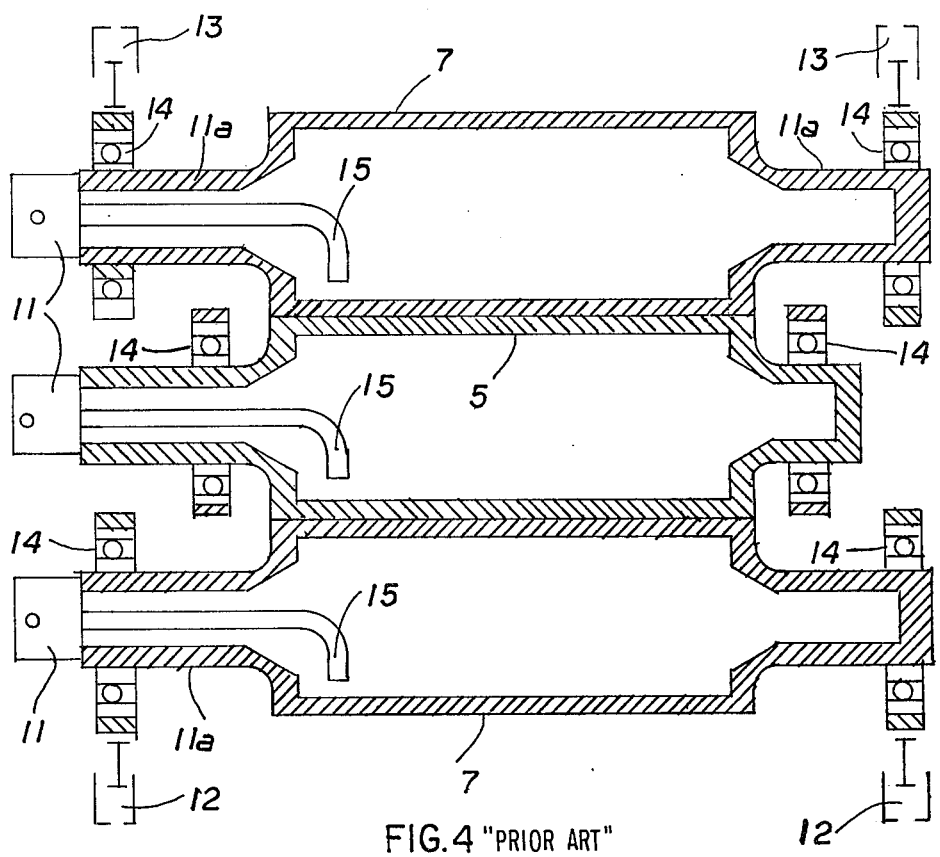
FIG. 4 is a sectional view taken along the line 4—4 in FIG. 3 showing the contacting condition of the rolls of a conventional single facer.

As shown in FIG. 4, the two corrugating rolls 4 and 5 and the pressure roll 7 are all formed as hollow cylinders. Each of the rolls includes a rotary joint 11. Each of the rolls further includes axially extending shaft portions 11a at each end. These shaft portions are received in bearings 14. Pressure cylinders 12 and 13 are provided for supporting the bottom and top bearings 14.

High-pressure, high-temperature vapor, such as steam, is introduced into the interior of the upper and lower corrugating rolls 4, 5 and the pressure roll 7 through the rotary joints 11. The vapor is recovered through siphon pipes 15. In order to apply a pressure, which is necessary for the corrugation-molding of a core sheet, to the meshed portions of the upper and lower corrugating rolls 4, 5, a pressure is applied from pressure cylinders 13 to the bearings 14 of the upper corrugating roll 4. Pressure is similarly applied from pressure cylinders 12 to the bearings 14 of the pressure roll 7 so as to bond the core sheet 1 to the liner 2 at a predetermined pressure.

In manufacturing single-faced corrugated paper in apparatus of this general type, the core sheet 1 is heated and moistened as it passes a mill roll stand (not shown), a preheating roll (not shown), and a moistener (not shown), all of which are well known in the art, and is then directed to the upper corrugating roll 4. The core sheet 1 then passes through a narrow space or nip between the upper corrugating roll 4 and the lower corrugating roll 5 where the meshing teeth cause the sheet to be formed into alternating ridges and grooves, that is, to be corrugated. Thereafter, paste is applied to the tips of the corrugations by the pasting roll 6, and the sheet 1, with the paste applied thereto, passes between the lower corrugating roll 5 and the pressure roll 7 where the liner 2 is forced against the pasted tips of the corrugations and bonded thereto to form the single-faced corrugated paper. As discussed earlier in this application, in order to provide for more rapid corrugated paper manufacture, it is necessary to provide for more rapid heat transfer from the high-temperature vapor within the rolls through the roll wall or shell to the exterior surface thereof. One way of increasing the rate of heat transfer has been to reduce the thickness of the walls of the rolls. However, as also discussed earlier in this application, the reduction in the thickness of the wall has given rise to a problem of increased noise and it is the purpose of this invention to reduce the noise so that the thinner-walled rolls may be employed while still keeping the noise at an acceptable level.

Figure 5:
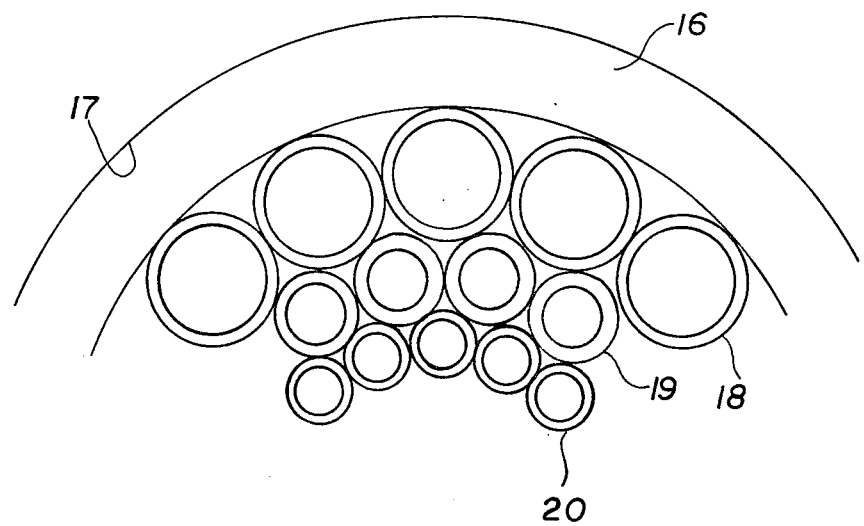
FIG. 5 is a partial transverse sectional view of a roll of a single facer incorporating one embodiment of this invention.

Turning now to FIG. 5, there is shown a partial sectional view of one of the rolls of a single facer including a roll shell 16. As explained above, when a shell of reduced thickness is employed, there is increased elastic deformation of the roll and, hence, increased elastic vibration. This gives rise to a problem of increased noise which it is the purpose of this invention to eliminate. This is accomplished by providing internally of the roll a structure for resisting the elastic deformation and, hence, limiting the elastic vibration of the roll. Specifically, as shown in FIG. 5, a plurality of elongated tubular members 18 are provided in the hollow interior of the roll in engagement with the interior wall 17 of the roll. In the form of the invention shown in FIG. 5, these tubular members are in the form of tubes of the same diameter and these tubes are arranged about the interior wall of the roll with the centers of the tubes along a circle concentric with the interior wall 17. While only a portion of the roll is shown in FIG. 5, it will be understood that the tubes 18 extend entirely around the circumference of the interior wall of the roll. The diameter of the tubes in relation to the size of the roll is chosen so that the tubes 18 are in contact not only with the interior wall 17 but also in firm contact with each other. The tubes are slightly compressed so that they are wedged by their natural resilience into firm engagement with the interior wall 17, so that the frictional engagement of the tubes with this interior wall 17 of the shell 16 resists the elastic vibration of the roll and consequently effects a reduction in the noise generated by the operation of the single facer. While, in the form of the invention shown in FIG. 5, the tubes 18 are of circular cross section, and this is the preferred form for these tubes, it will be understood that elongated tubular members of other shapes, such as oval or polygonal, could be employed so long as the dimensions are such that the elongated tubular elements are firmly held against each other and against the interior wall 17. Accordingly, as used in this specification and in the claims, it is to be understood that the expression "tubular member" or "tube" is to be considered as embracing structures having cross sections other than circular.

For further assisting in reducing the noise, additional groups of tubes 19 and 20 may be employed, as shown in FIG. 5, radially inward of the tubes 18. In this case, the second group of tubes 19 are of smaller diameter than the tubes 18 and are arranged along a concentric circle radially inward of the concentric circle upon which the centers of the tubes 18 are positioned. Each of the tubes 19 is also positioned so that it engages two adjacent tubes 18 in the area between the exterior walls of these tubes. Similarly, the tubes 20 of the third group are of smaller diameter than the tubes 19 and are arranged radially inwardly of the tubes 19 with their centers along a smaller concentric circle. Each of the tubes 20 is positioned in contact with two adjacent tubes 19 in the same relationship as the tubes 19 bear to the tubes 18. The number of tubes in each of the three concentric rows is the same. The arrangement of the tubes on concentric circles as shown in FIG. 5 efficiently provides for the tubes contacting each other at as many points as possible. Each of the tubes 18 has a suitable contact pressure, for example, from 0.1 to 10 Newtons per $mm^2$, with respect to the interior wall of the roll shell and a suitable rigidity to secure a firm frictional engagement for providing an attenuating effect with respect to the elastic deformation of the roll. Similarly, the tubes 19 and 20 have suitable contact pressure with each other and with tubes in adjacent concentric rows and have a suitable rigidity for providing a further attenuating effect.

Figure 6:
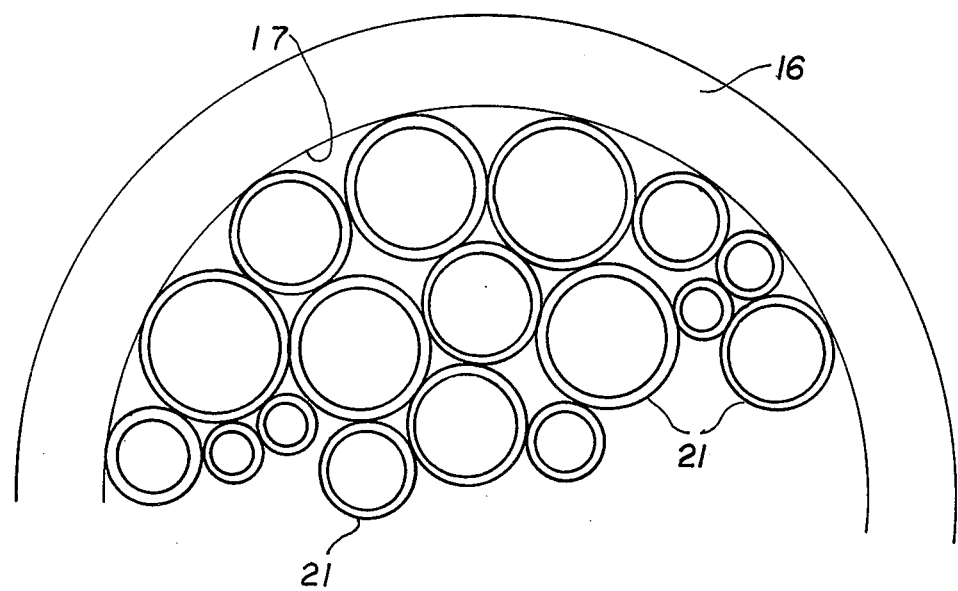
FIG. 6 is a partial transverse sectional view of a roll showing a modified form of this invention.

In the modified form of the invention shown in FIG. 6, tubes 21 of varying diameters and thicknesses are arranged in a more random fashion within the shell 16 rather than being arranged in concentric rows as in FIG. 5 wherein the tubes in each concentric row are of the same diameter and thickness. The tubes 21 in the modification of FIG. 6 are, however, arranged so as to be in contact with one another, with the outermost tubes in firm frictional relationship with the interior wall 17 of the shell to attenuate the elastic vibration of the roll and reduce the noise resulting therefrom.

Figure 7:
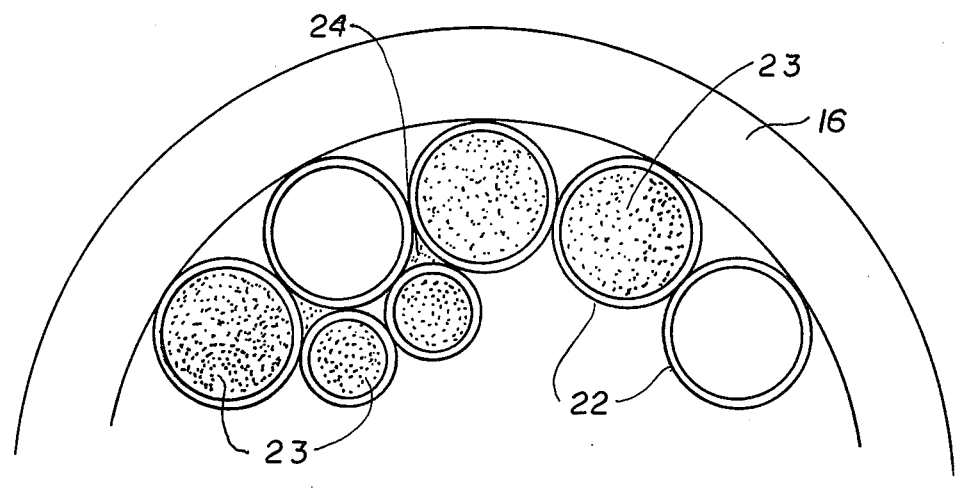
FIG. 7 is a partial transverse sectional view showing another modified form of this invention.

In FIG. 7 there is shown an arrangement similar to that previously described in connection with FIG. 5, except that in the modification shown in FIG. 7, a vibration-restricting material comprising a powdered material, such as sand or concrete, or a liquid material, such as oil, is sealed within all or some of the tubes 22, as shown at 23, to further increase the vibration-restricting effect and thereby to further reduce the noise. In addition, the same type of material may be arranged in some or all of the gaps between adjacent pipes, as shown at 24. While for convenience of illustration only a few tubes 22 have been shown in FIG. 7, it will be understood that the tubes are arranged concentrically around the entire interior of the shell 16 as in the form of invention previously described in connection with FIG. 5.

Figure 8:
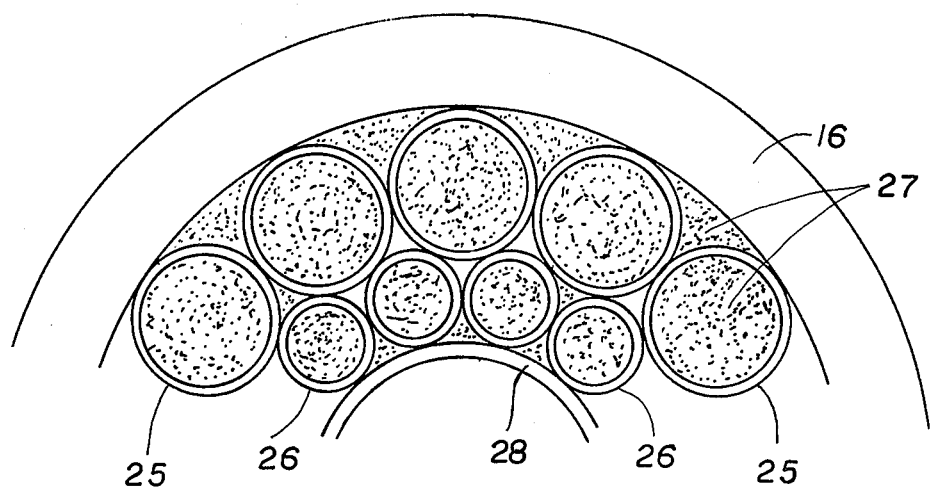
FIG. 8 is a partial transverse sectional view of a roll showing still another modified form of this invention.

FIG. 8 shows still another modified form of this invention. This includes a plurality of tubes 25 and 26 arranged in concentric rows similar to the arrangement of the tubes 18 and 19 in the form of the invention shown in FIG. 5. The modification shown in FIG. 8 also includes vibration-restricting material 27 such as that employed in the modification shown in FIG. 7. In the form of invention shown in FIG. 8, there is also included a centrally disposed tube 28 of relatively large diameter which engages each of the concentrically arranged tubes 26. The tube 28 presses against the tubes 26 and urges these tubes also into engagement with the outer row of tubes 25 so that these tubes 25 press against the interior wall of the shell 16, thereby providing a further vibration-attenuating effect. The tube 28 also helps ensure that the concentrically arranged tubes 25 and 26 remain in position throughout the life of the apparatus. The tube 28 serves as a central passage for the high-temperature vapor. Where no vibration-restricting material is employed, as shown in FIGS. 5 and 6, heated vapor can flow inside and outside the tubes, for example, tubes 18, 19, 20 in FIG. 5 or tube 21 in FIG. 6, and heat transfer is easily accomplished. Where vibration-restricting material is employed, as in FIG. 8, for example, heated vapor cannot flow inside or outside the tubes 25 and 26. In this case heat is transferred from inside tube 28 through the walls of tubes 25 and 26 to the shell 16.

While not shown therein, it will be apparent that a centrally disposed tube, similar to the tube 28, may be arranged, if desired, adjacent the inner tubes 20 in the form of invention shown in FIG. 5.

Figure 9:
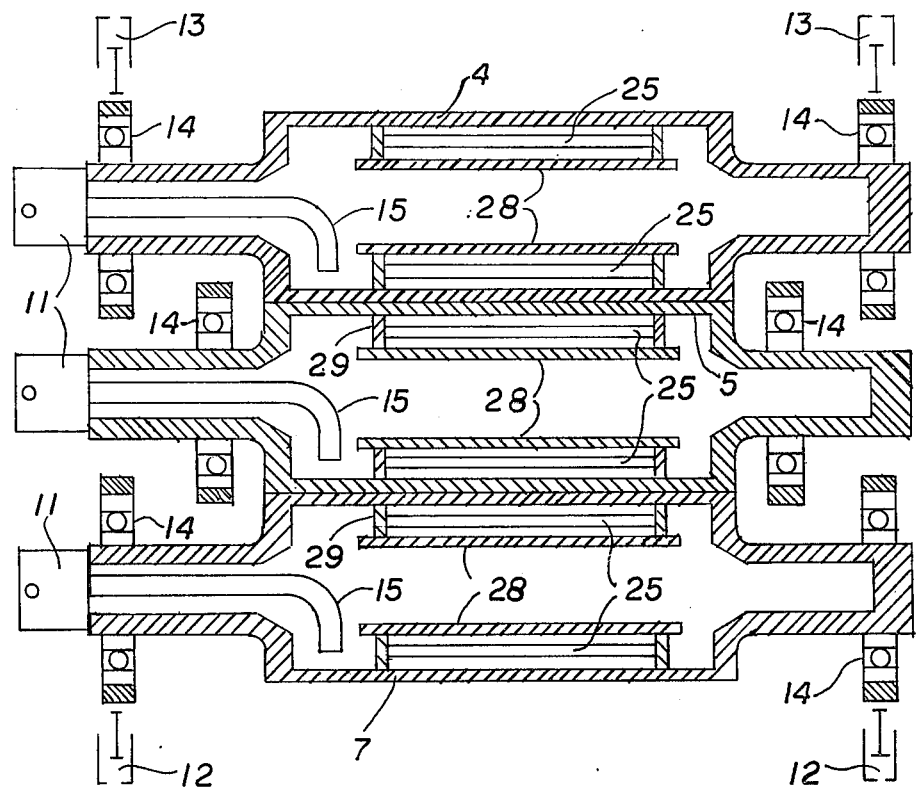
FIG. 9 is a longitudinal sectional view of the rolls of a single facer taken along a line generally corresponding to line 4—4 in FIG. 3 and illustrating a structure similar to that shown in FIG. 8.

FIG. 9 is a sectional view similar to that shown in FIG. 4, but incorporating the modified form of vibration-attenuating structure shown in FIG. 8. For convenience, however, only one row of tubes 25 has been shown in the illustration in FIG. 9. In the structure shown in FIG. 9, the centrally disposed tube 28 serves as a passage for vapor and the vibration-attenuating tubes 25 are positioned between the tube 28 and the interior wall of each roll so as to frictionally engage the interior wall and provide for vibration attenuation. In the structure shown in FIG. 9, annular end plates 29 are provided at each end of the row of tubes 25 for assisting in fixing these tubes 25 in place. These end plates are fixed to the interior wall of each of the rolls 4, 5, 7. If it is desired to pass the high-temperature vapor through the tubes 25 to provide more effective heating of the exterior surface of each of the rolls, the annular end plates 29 are provided with slits or bores to permit passage of this vapor.

While in the form of invention shown in FIG. 9 only a single concentrically arranged row of tubes 25 are shown extending substantially the full length of each of the rolls, the tubes may be grouped in two or more axially spaced positions in a distributed manner along the length of the rolls. Thus, there may be two or more groups of concentrically arranged tubes within a roll, positioned in axially spaced relationship along the length of the roll.

Figure 10:
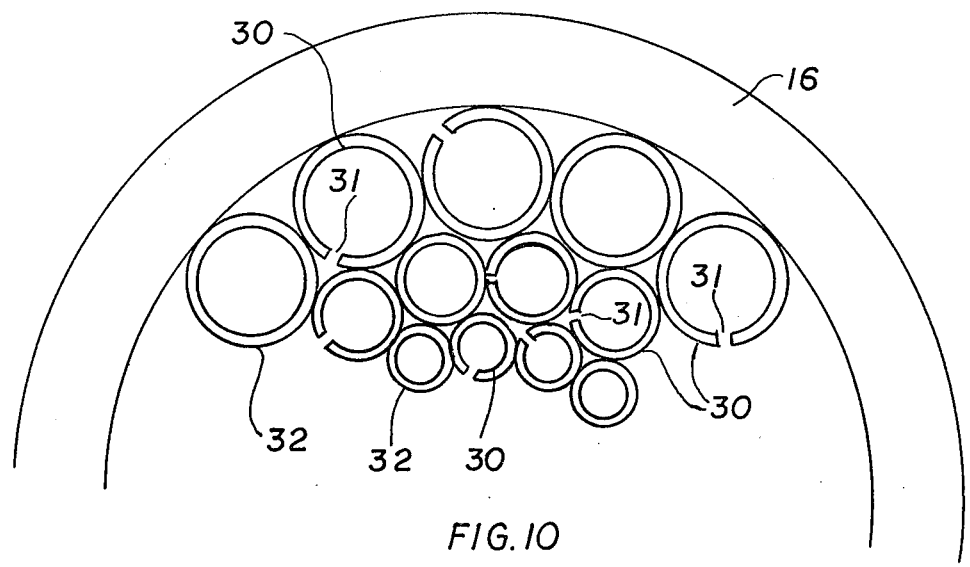
FIG. 10 is a partial transverse sectional view of a roll showing a further modified form of this invention.

Another modified form of the invention is shown in FIG. 10. This differs from the form of invention shown in FIG. 5 in that some of the tubes have an axially extending slit. Specifically, in FIG. 10, tubes 30 have axially extending slits 31, while the remaining tubes, indicated at 32, have continuous walls as in the case of the tubes shown in FIG. 5. The slit tubes 30 are employed in this modification to permit easier insertion and assembly of the tubes within the roll and to set the tubes at a predetermined contact pressure. If desired, all of the tubes may be in the form of the slit pipes 30. In the event the ends of the tubes are closed, the slits in the tubes will also serve the purpose of facilitating the transfer of the high-temperature vapor from the central portion of the roll outwardly toward the shell thereof. Such facilitation of heat transfer may be provided by the slits shown or, alternatively, holes may be provided in the cylindrical walls of the tubes to improve the heat transfer rate. Cylindrically-bent perforated sheets, such as cylindrically-bent punched metallic sheets, may be employed for this purpose.

While the invention has been described and illustrated utilizing straight tubes, curved tubes suitably combined may be employed, if desired. Further, rods may be mixed with the tubes arranged in a roll. Rods usable in this manner may be made of metal or of non-metallic materials, such as concrete.

In rolls constructed in accordance with this invention the tubes have a frictional engagement at such portions thereof as are in contact with the interior wall of the roll and with the outer surfaces of adjacent tubes, and the tubes so arranged generate frictional resistance with respect to the vibrations, especially elastic vibrations, of the rolls during the operation of the single facer. Therefore, a single facer constructed in accordance with the present invention, which has thin roll shells for obtaining an improved heat transfer rate, displays a high vibration-attenuating effect. Hence, the noise level is lowered below that which would otherwise occur and, moreover, metallic noise can be prevented from occurring.

While particular structures embodying the invention have been shown and described, it is not intended that the invention be limited to the specific structures so shown and described, and it is intended by the appended claims to cover all modifications which come within the spirit and scope of this invention.

It is claimed:

1. A roll for a single facer comprising:
   (a) a hollow rigid cylinder having an interior wall;
   (b) means for reducing elastic vibration and noise from the roll during operation of the single facers;
   (c) said means comprising a first plurality of elongated hollow members disposed in said cylinder in contact with each other and with said interior wall;
   (d) said means further comprising means for holding said members in contact with said interior wall.

2. The roll of claim 1 wherein each of said elongated hollow members comprises a tube.

3. The roll of claim 2 wherein all of said tubes have the same diameter and said tubes are arranged in contact with said interior wall with the centers of said tubes arranged along a circle concentric with said interior wall.

4. The roll of claim 3 and further including a second plurality of tubes of smaller diameter than the diameter of said first plurality of tubes, each of said second plurality of tubes being disposed in contact with two adjacent ones of said first plurality of tubes.

5. The roll of claim 4 and further comprising a third plurality of tubes of smaller diameter than the diameter of said second plurality of tubes, each of said third plurality of tubes being disposed in contact with two adjacent ones of said second plurality of tubes.

6. The roll of claim 5 and wherein said means for holding comprises a tube disposed centrally within said hollow cylinder, said centrally disposed tube being of a diameter such that it engages all of said third plurality of tubes to urge said tubes outwardly and urge said first plurality of tubes in firm contact with said interior wall.

7. The roll of claim 3 wherein said means for holding comprises a tube disposed centrally within said hollow cylinder, said centrally disposed tube having an outside diameter such that it engages all of said first plurality of tubes to hold said first plurality of tubes in firm contact with said interior wall.

8. The roll of claim 2 wherein:
   (a) each of said first plurality of tubes has a length less than the internal length of said hollow cylinder;
   (b) an annular member is disposed at each end of said plurality of tubes; and
   (c) each of said annular members is fixed to said interior wall for preventing lengthwise movement of said tubes.

9. The roll of claim 8 wherein at least one of said annular members has an opening therethrough to provide for passage of heated fluid from the central portion of said hollow cylinder to the area of said interior wall between said annular members.

10. The roll of claim 2 wherein said first plurality of tubes comprises a plurality of groups of tubes, said groups being spaced axially along the length of said hollow cylinder.

11. The roll of claim 10 wherein:
    (a) an annular member is disposed at each end of each group of tubes; and
    (b) each of said annular members is fixed to said interior wall to prevent lengthwise movement of said tubes.

12. The roll of claim 1 wherein each of said elongated hollow members has an opening therein providing for passage of heated fluid from the central portion of said hollow cylinder to said interior wall for transmitting heat through said wall to the exterior surface of said hollow cylinder.

13. The roll of claim 1 wherein at least some of the spaces between adjacent elongated hollow members are filled with a sound-deadening material.

14. The roll of claim 1 wherein the interior of at least some of said elongated hollow members is filled with a sound-deadening material.

15. The roll of claim 13 or 14 wherein said sound-deading material is solid or liquid.

16. The roll of claim 15 wherein said solid material is sand or concrete.

17. The roll of claim 15 wherein said liquid material is oil.

18. The roll of claim 2 wherein some of said tubes are replaced by rods.

19. The roll of claim 1 wherein each of said elongated hollow members is formed of a resilient material and includes a longitudinal slit therein for providing for compressibility of said members into the available space to provide firm contact of said members with each other and with said interior wall.

20. The roll of claim 2 wherein:
    (a) said tubes fill a substantial portion of the hollow interior of the roll;
    (b) said tubes are of differing diameters and wall thicknesses; and
    (c) said tubes of different diameters and wall thicknesses are distributed in random fashion with each tube frictionally engaging adjacent tubes and the radially outermost tubes frictionally engaging said interior wall.

* * * * *